US007809635B2

(12) United States Patent
Cagan et al.

(10) Patent No.: US 7,809,635 B2
(45) Date of Patent: Oct. 5, 2010

(54) METHOD AND SYSTEM FOR UPDATING A LOAN PORTFOLIO WITH INFORMATION ON SECONDARY LIENS

(75) Inventors: Christopher L. Cagan, Los Angeles, CA (US); Charles E. Crawford, Jr., Plantation, FL (US); David Gussmann, San Francisco, CA (US)

(73) Assignee: Corelogic Information Solutions, Inc., Santa Ana, CA (US)

( * ) Notice: Subject to any disclaimer, the term of this patent is extended or adjusted under 35 U.S.C. 154(b) by 103 days.

(21) Appl. No.: 11/499,341

(22) Filed: Aug. 4, 2006

(65) Prior Publication Data

US 2007/0033126 A1 Feb. 8, 2007

Related U.S. Application Data

(60) Provisional application No. 60/705,928, filed on Aug. 5, 2005.

(51) Int. Cl.
*G06Q 40/00* (2006.01)
(52) U.S. Cl. .................. 705/38; 705/36 R; 705/4; 705/37; 235/80
(58) Field of Classification Search ............ 705/38, 705/4; 235/80
See application file for complete search history.

(56) References Cited

U.S. PATENT DOCUMENTS

| 4,870,576 | A |   | 9/1989  | Tornetta    |         |
|-----------|---|---|---------|-------------|---------|
| 4,918,526 | A |   | 4/1990  | Lewis et al.|         |
| 5,032,989 | A |   | 7/1991  | Tornetta    |         |
| 5,193,056 | A |   | 3/1993  | Boes        |         |
| 5,361,201 | A |   | 11/1994 | Jost et al. |         |
| 5,414,621 | A | * | 5/1995  | Hough       | 705/10  |
| 5,680,305 | A |   | 10/1997 | Apgar, IV   |         |

(Continued)

FOREIGN PATENT DOCUMENTS

JP      2001236369      8/2001

(Continued)

OTHER PUBLICATIONS

Jay Romano, Your Home: Holding a Hostage, Aug. 22, 1999, New York Times (Hostage).*

(Continued)

*Primary Examiner*—Ella Colbert
*Assistant Examiner*—Chika Ojiaku
(74) *Attorney, Agent, or Firm*—Snell & Wilmer L.L.P.

(57) ABSTRACT

A computer-based method of updating a client loan portfolio with information on secondary liens relatable to portfolio properties includes inputting property data from the portfolio, monitoring a secondary lien database for secondary liens relatable to the property data, and notifying the client if a secondary lien is detected. Notifying the client may include generating a secondary lien report containing an AVM score or a CLTV ratio, and updating the portfolio by generating a new version of the portfolio that includes secondary liens detected during monitoring. A system may include a client station for inputting data for monitoring, an FTP server for uploading the data from the client station, and a mainframe server for standardizing the data, searching databases for secondary liens, calculating the AVM score and CLTV ratio, and generating the secondary lien report for delivery to the client station via the FTP server.

15 Claims, 4 Drawing Sheets

U.S. PATENT DOCUMENTS

| | | | |
|---|---|---|---|
| 5,754,850 | A | 5/1998 | Janssen |
| 5,794,216 | A | 8/1998 | Brown |
| 5,852,810 | A | 12/1998 | Sotiroff et al. |
| 5,857,174 | A | 1/1999 | Dugan |
| 5,867,155 | A | 2/1999 | Williams |
| 6,115,694 | A | 9/2000 | Cheetham et al. |
| 6,141,648 | A | 10/2000 | Bonissone et al. |
| 6,178,406 | B1 | 1/2001 | Cheetham et al. |
| 6,323,885 | B1 | 11/2001 | Wiese |
| 6,397,208 | B1 | 5/2002 | Lee |
| 6,401,070 | B1 | 6/2002 | McManus et al. |
| 6,484,176 | B1* | 11/2002 | Sealand et al. ............... 1/1 |
| 6,505,176 | B2 | 1/2003 | DeFrancesco et al. |
| 6,587,841 | B1 | 7/2003 | DeFrancesco et al. |
| 6,609,118 | B1 | 8/2003 | Khedkar et al. |
| 6,636,803 | B1 | 10/2003 | Hartz, Jr. et al. |
| 6,681,211 | B1 | 1/2004 | Gatto |
| 6,748,369 | B2 | 6/2004 | Khedkar et al. |
| 6,836,270 | B2* | 12/2004 | Du ........................ 345/419 |
| 6,842,738 | B1 | 1/2005 | Bradley et al. |
| 7,043,501 | B2 | 5/2006 | Schiller |
| 7,054,741 | B2 | 5/2006 | Harrison et al. |
| 7,076,448 | B1 | 7/2006 | Snyder |
| 7,289,965 | B1 | 10/2007 | Bradley et al. |
| 7,333,943 | B1* | 2/2008 | Charuk et al. ............. 705/26 |
| 2001/0029477 | A1 | 10/2001 | Freeman et al. |
| 2001/0039506 | A1 | 11/2001 | Robbins |
| 2001/0047327 | A1* | 11/2001 | Courtney ................ 705/38 |
| 2002/0035535 | A1 | 3/2002 | Brock, Sr. |
| 2002/0052766 | A1 | 5/2002 | Dingman et al. |
| 2002/0087389 | A1* | 7/2002 | Sklarz et al. ............. 705/10 |
| 2002/0099650 | A1 | 7/2002 | Cole |
| 2002/0103669 | A1* | 8/2002 | Sullivan et al. ............ 705/1 |
| 2002/0133371 | A1 | 9/2002 | Cole |
| 2002/0147613 | A1 | 10/2002 | Kennard et al. |
| 2003/0011599 | A1* | 1/2003 | Du ........................ 345/428 |
| 2003/0036995 | A1 | 2/2003 | Lazerson |
| 2003/0036996 | A1 | 2/2003 | Lazerson |
| 2003/0046099 | A1 | 3/2003 | Lamont et al. |
| 2003/0093366 | A1 | 5/2003 | Halper et al. |
| 2003/0126071 | A1 | 7/2003 | Keyes et al. |
| 2003/0144948 | A1* | 7/2003 | Cleary et al. .............. 705/38 |
| 2003/0149658 | A1 | 8/2003 | Rossbach |
| 2003/0149659 | A1* | 8/2003 | Danaher et al. ........... 705/38 |
| 2003/0191723 | A1 | 10/2003 | Foretich et al. |
| 2004/0019517 | A1 | 1/2004 | Sennott |
| 2004/0021584 | A1 | 2/2004 | Hartz, Jr. et al. |
| 2004/0039581 | A1* | 2/2004 | Wheeler .................... 705/1 |
| 2004/0049440 | A1 | 3/2004 | Shinoda et al. |
| 2004/0078464 | A1* | 4/2004 | Rajan et al. ............. 709/224 |
| 2004/0128232 | A1 | 7/2004 | Descloux |
| 2004/0133493 | A1* | 7/2004 | Ford et al. ................ 705/35 |
| 2004/0153330 | A1 | 8/2004 | Miller et al. |
| 2004/0243450 | A1 | 12/2004 | Bernard |
| 2005/0108025 | A1 | 5/2005 | Cagan |
| 2005/0171822 | A1 | 8/2005 | Cagan |
| 2005/0192999 | A1 | 9/2005 | Cook et al. |
| 2005/0216292 | A1 | 9/2005 | Ashlock |
| 2005/0288942 | A1 | 12/2005 | Graboske et al. |
| 2006/0015357 | A1 | 1/2006 | Cagan |
| 2006/0026136 | A1* | 2/2006 | Drucker et al. ............. 707/3 |
| 2006/0064415 | A1 | 3/2006 | Guyon et al. |
| 2006/0085234 | A1* | 4/2006 | Cagan ....................... 705/7 |
| 2006/0105342 | A1 | 5/2006 | Villena et al. |
| 2006/0122918 | A1 | 6/2006 | Graboske et al. |
| 2006/0200492 | A1 | 9/2006 | Villena et al. |
| 2006/0218003 | A1 | 9/2006 | Snyder |
| 2006/0218005 | A1 | 9/2006 | Villena et al. |
| 2006/0271472 | A1 | 11/2006 | Cagan |
| 2007/0033122 | A1 | 2/2007 | Cagan |
| 2008/0097767 | A1* | 4/2008 | Milman et al. ............. 705/1 |
| 2008/0281649 | A1* | 11/2008 | Morris ...................... 705/7 |

FOREIGN PATENT DOCUMENTS

| | | |
|---|---|---|
| JP | 2002123589 | 4/2002 |
| KR | 1020010078857 | 8/2001 |
| KR | 1020010105569 | 11/2001 |
| KR | 1020020004710 | 1/2002 |
| KR | 1020050064605 | 6/2005 |

OTHER PUBLICATIONS

Mike Neumeier Doona Freydkin, KnowX Web Site Simplifies Access to Public Records, Apr. 14, 1998, AllBusiness (KnowX).*

Doug Gordon, "Accurate AVM Values Help Monitor Subprime Appraisal Risk", Presented at MBA Subprime, May 13, 2004.

Douglas Gordon and Bud Sottili, "Precision is Crucial for AVM Selection", Secondary Marketing Executive, Apr. 2002.

Oshika, Beatrice T., "Computational Techniques for Improved Name Search", pp. 203-210.

"Median Price By Zip Code By Month for May 2004," DataQuick Information Systems, *Los Angeles Times*, 6 pages, Jun. 2004.

"GIS for Real Estate," www.esri.com, 1 page, Feb. 15, 2007.

"Using GIS for Real Estate Market Analysis: The Problem of Spatially Aggregated Data," John Clapp, Journal of Real Estate Research, 9 pages, 1998.

"What's Your Home Worth," www.homevaluecma.com, 2 pages, Feb. 15, 2007.

"MBA's First Fraud Awareness Seminar: Detecting Fraud in the Mortgage Process," *Mortgage Bankers Association of America*, 1 page, Aug. 15, 2000.

"Freddie Fights Fraud with Technology, Score Helps Identify Inflated Property Values," *Mortgage Bankers Association of America*, 1 page, Mar. 15, 2002.

"Fraud on the Rise Advantage Credit Finds 23% of Brokers Surveyed Received Fraudulent Loan Applications," *Inman News Features*, 1 page, Sep. 17, 2002.

"City in Flames Atlanta Fraud Network Responsible for More than $100 Million in Losses," Sam Garcia, MortgageDaily.com, 2 pages, Nov. 14, 2002.

"Fraud Flips National Phenomenon a Look at Mortgage Fraud Schemes," Christy Robinson, MortgageDaily.com, 2 pages, Dec. 9, 2002.

"Pre Funding and Your Business!" Lisa Binkley et al., *QA Rockin' the Bay*, 31 pages, Jan. 31, 2003.

"Accurate Home Valuations . . . in Seconds!" *Veros Corp.*, 1 page, date unknown.

"Automated Valuation Models (AVM)," *Informative Research Corp.*, 1 page, date unknown.

"FNIS Launches QuadMerge™ Value," TitleWeb.com, 2 pages, date unkown.

"Home Value Explorer®," *Freddie Mac Corp.*, 1 page, date unknown.

"Freddie Mac's Home Value Explorer, VeroVALUE," *Determination Processing Services*, Inc., 3 pages. date unknown.

"Identifying & Managing Technology Risks, Automated Valuation Models," Lewis J. Allen, 36 pages, date unknown.

"LSI Indicator, an LSI Collateral Assessment Solutions," LendersService.com, 2 pages, date unknown.

"Mitigating Portfolio Risk During a Flat Market," Gregory F. Hansen, 2 pages, date unkown.

"QuadMerge™ & QuadMerge Value™ Quick Reference Guide," *FNIS Corp.*, 1 page, date unknown.

"VEROS™ Software," verso.com, 31 pages, date unknown.

"AVM Debate Tilts in Favor: The mortgage lending industry may finally be ready embrace technology to automated the valuation function (Technology Information)," Mary Dunn, *Mortgage Technology*, 5 pages, Jul. 2001.

"Collateral Score Pat 1-Scoring Applications in Residential Mortgage Lending: A Survey of Issues," Nima Nattagh, et al. FNC White Paper, 8 pages, Feb. 2002.

"Home Price Analyzer: Online Index-Based Residential Property Valuations," homepriceanalyzer.com, 2 pages, Oct. 2002.

"FNIS Launches New Tool, HQ Score," *Real Estate Weekly*, Hagedorn Publication, 1 page, Apr. 30, 2003.

"Quick Value AVM Services: Instant Online AVMs Make for Rapid Decision Making," www.1sourcedata.com, 1 page, 2003.

"FNIS Hansen QRS: Product Overview," www.FNIS.com, 1 page, 2003.

"Forecasting Valuation Risk for Real Estate and Other Industries," Eric P. Fox, *Veros Software*, 14 pages, Jun. 17, 2003.

"PASS Valuation Model," Basis 100 Corp., 1 page, Jul./Aug. 2003.

"Freddie Mac's Home Value Explorer®," Freddie Mac, 1 page, Nov. 2003.

"Freddie Mac's Home Value Explorer®, Product Enhancement Summary Forecast Standard Deviation (FDS)," Freddie Mac, 2 pages, Apr. 4, 2004.

Keller, Paul & Pyzdek, Thomas. Six Sigma Demystified. McGraw-Hill Professional. 2004. pp. 3-4, 100-102, 147-148 and 291-292.

Meyer. Philip. Precision Journalism. Rowman & Littlefield Publishers. 2002. pp. 39-41.

\* cited by examiner

METHOD AND SYSTEM FOR UPDATING A LOAN PORTFOLIO WITH INFORMATION ON SECONDARY LIENS

CLAIM OF PRIORITY UNDER 35 U.S.C. §119

The present Application for Patent claims priority to Provisional Application No. 60/705,928 entitled "METHOD AND APPARATUS FOR MONITORING MORTGAGE PORTFOLIO," filed Aug. 5, 2005, and assigned to the assignee hereof and hereby expressly incorporated herein by reference.

This application is related to U.S. patent application Ser. No. 11/499,401, entitled "Method and System for Monitoring for and Reporting of Lien Distress Events," filed concurrently herewith, and expressly incorporated herein by reference.

BACKGROUND

1. Field

The present invention relates to real estate loans on properties and more particularly to a method and system for monitoring loans on properties and liens associated with those properties, determining when a secondary lien has been filed against a property, and reporting that information to an interested party.

2. Background

When purchasing real property, purchasers often require or desire to use financing. During this process, the lender often acquires a lien on the property. Liens, usually in one of two forms, enable the lender in the case of default on repayment of the loan, to either take possession and then sell the property in order to repay the loan amount or to force a sale of the property with first rights to the proceeds of the sale up to the amount owed on the loan. In either case, this right is referred to as a lien.

There are also varying degrees of liens. The first or primary lender on the property has a first lien or first position. A second mortgagee has a second lien or second position. Subsequent liens are prioritized according to a tertiary position, usually in order of recordation. A lender higher in priority is a senior lender with respect to a lender lower in priority. A lender lower in priority is a junior lender with respect to a lender higher in priority.

When a sale of a property is made or forced pursuant to the rights of one lender's lien, other lenders having liens on the same property have a right of repayment in the specified order of priority. So, for example, a second loan may be taken out on a property in order to make home improvements on the property, and the corresponding secondary lender may place a secondary lien on the property. In this case, the first mortgage lien has first position and the second mortgage lien has second position. If either loan defaults, the property may be sold and the first loan would be paid off prior to the second loan. Any remainder would be used to pay down the second loan, any remainder thereafter would pay off tertiary positions, and any final remainder would be returned to the mortgagor.

A Loan-to-Value (LTV) ratio is the loan amount expressed as a percentage of the purchase price or the appraised value of the property. For example, if a buyer makes a 10 percent cash down payment on the property the buyer is purchasing, the LTV is 90 percent. Conversely, if a buyer makes a 90 percent cash down payment on the property the buyer is purchasing, the LTV is 10 percent. If a subsequent mortgage were to encumber the property, the LTV of the property would increase because a greater percentage of the property value would become debt secured by mortgage.

For a potential purchaser of the primary loan, a high LTV signifies a greater risk that the primary loan may not be repaid by the borrower. Borrowers with little equity in the property have less to lose by a default than those with greater equity. The more equity a property owner has in a property, the more money is available to the creditor on default. Thus, the primary lender, who has loaned the most amount of money on the property, or someone interested in purchasing the primary loan, has an incentive to monitor the extent of secondary loans secured by the property. Such information is critical in assessing the LTV, and thus the present risk associated with the first loan.

Investors who are interested in buying and selling portfolios of loans on real estate, and the right to enforce first liens that accompany transfer of the portfolio, often do not know if a secondary lien has been filed against a collateral property within the portfolio. If a secondary lien has been filed against any property in the portfolio, the LTV of that property can be higher than the LTV represented in the loan portfolio, and consequently the value of the loan, and the value of the portfolio, may be lower than the originally estimated by a potential investor.

A Combined Loan-to-Value (CLTV) ratio takes both primary and secondary loans into account. CLTV is the ratio of the sum of all mortgage amounts encumbering a property to an estimate of the property worth. While a LTV may be easily established upon issuing a primary mortgage loan for purchasing real property, once the sale is finalized, the mortgagor may further encumber the property with secondary loans at any time during the life of the primary loan, freely and without notifying the primary lender. Thus, for a lender or financial institution in the business of expanding, transferring, or acquiring large loan portfolios, maintaining accurate, up-to-date CLTV data for all loans within a portfolio becomes a burdensome task, especially in a market where loans are transferred among investors like commodities. What is needed in the industry is an efficient means for updating loan portfolios to ensure that LTV and CLTV ratios may be determined with greater accuracy.

SUMMARY

The present invention provides a method or system for updating a loan portfolio with information on secondary liens affecting the LTV ratio of properties within the portfolio. Databases containing information related to properties are monitored to detect secondary liens by matching property data from the portfolio to property data maintained in the databases. Once a secondary lien is detected, notice of the secondary lien may be forwarded to an interested client. Additional data pertaining to the subject property, such as an estimate of its value, a CLTV ratio, tax liability, and other relevant information may be reported along with the notice.

A computer-based method of updating a loan portfolio with information on secondary liens relatable to a property of interest within the portfolio includes receiving property data from the client loan portfolio, standardizing the property data into a form for use in querying a secondary lien database, and monitoring the secondary lien database for secondary liens relatable to the standardized property data. If a secondary lien relatable to the standardized property data is detected in the secondary lien database, notifying the client of the secondary lien may be performed. The monitoring may be performed periodically, and the client may specify the monitoring period as well as the content to be provided in a secondary lien report deliverable to the client. The standardized property data may include property address or borrower identification data, and the secondary lien database may be a public records database, tax assessor database, title transfer database, or credit reporting database. Any of these databases may be queried for information relevant to calculating an Automated Valuation Model (AVM) score, an LTV ratio, or a CLTV ratio, and for other information relevant to the property, lien holders, or mortgagors. In one embodiment, the method may automatically update a client loan portfolio with secondary lien information. In another embodiment, a client may subscribe to a service that performs the method.

A system may include a client station for inputting a client loan portfolio, an FTP server for uploading property data from the client station, and a mainframe server for accessing one or more secondary lien databases. The mainframe server may include a data standardization module to standardize the property data received, a database search engine for searching the secondary lien database, and a report generating module for reporting to the client station via the FTP server secondary lien information relating to the client loan portfolio.

A method or system of the present invention may enable portfolio owners and prospective portfolio buyers to quickly and accurately determine, with a high level of confidence, the value of properties reported in a loan portfolio, or the value of the portfolio as a whole. Updating loan portfolios according to the present invention may therefore streamline the process of loan portfolio transfer.

BRIEF DESCRIPTION OF THE DRAWINGS

The features, objects, and advantages of the present invention will become more apparent from the detailed description set forth below when taken in conjunction with the drawings, wherein.

DETAILED DESCRIPTION

The present invention provides a method and system for monitoring for secondary liens on properties and updating loan portfolios when secondary liens are discovered. The present invention is useful to a lender or financial institution for maintaining current data on properties within a loan portfolio, and may be particularly useful to a prospective buyer of loan portfolios for making accurate LTV or CLTV calculations.

Figure 1:
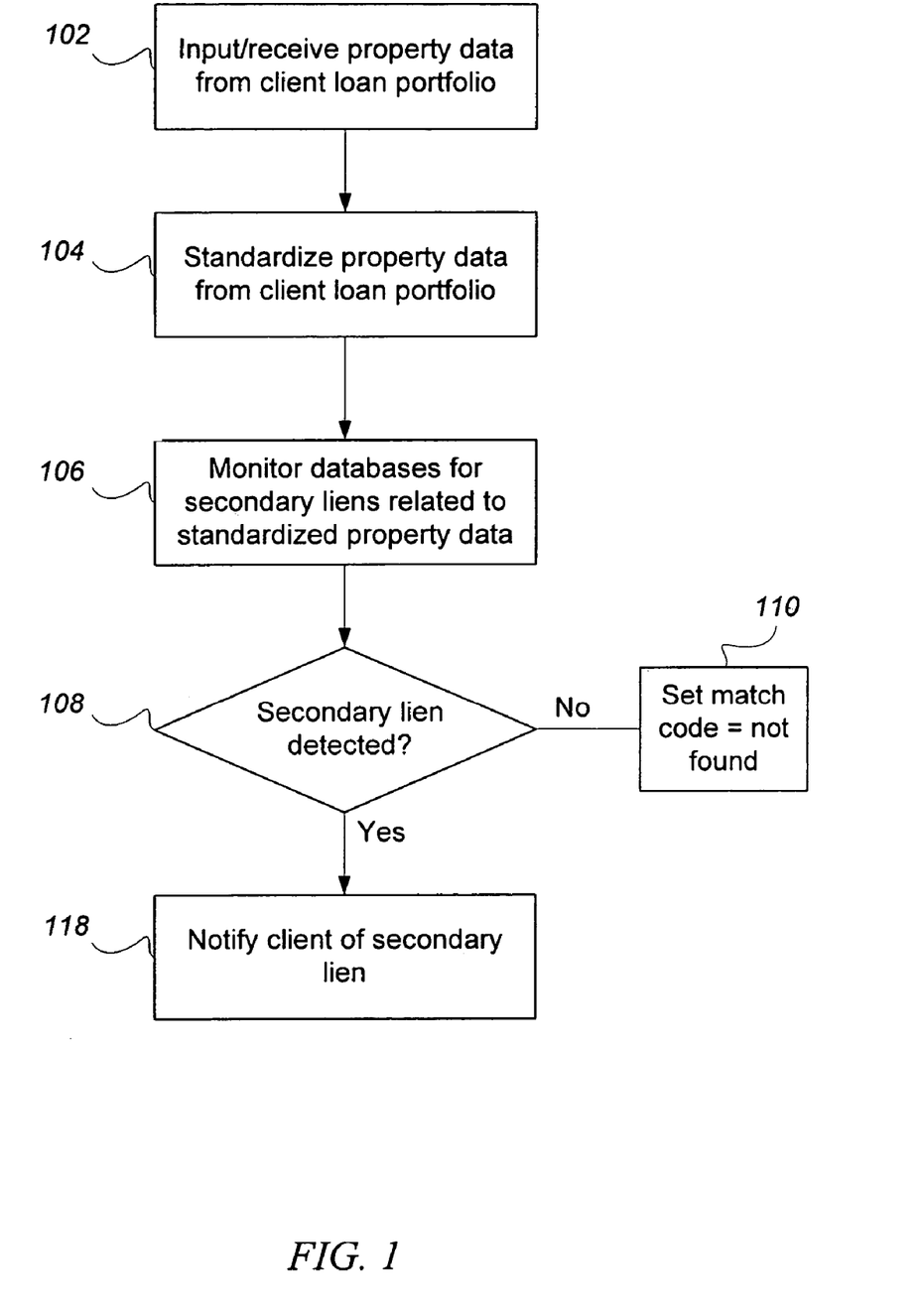
FIG. 1 is process flow chart illustrating a method for updating a loan portfolio with information on secondary liens according to an embodiment of the present invention.

FIG. 1 is a flow chart depicting a method 100 for updating a loan portfolio with information on secondary liens. Method 100 may be executed as a series of automated instructions stored in memory as software, hardware, or combinations thereof, executable by a controller, processor, or processing device. Method 100 may be performed using a computer system, or using a network of computers, such that one step of method 100 may be performed by one computer, and another step of method 100 may be performed by another computer. Method 100 may describe steps performed automatically as a service for a subscriber or client.

Method 100 may begin with step 102. In step 102, data relating to properties may be input or received from a client loan database or portfolio. A client may be a lender or lien holder in possession of a portfolio of loans, or an investor interested in purchasing a loan or loan portfolio. The portfolio of loans may be represented by data pertaining to properties and mortgagors that correspond to each loan and each loan in the portfolio may be represented by a portion of the data. The portfolio may be stored, e.g., as electronic data in a database or information archive, where each loan corresponds to a record that may include a plurality of data fields, where each data field may be updated, and where each record may be accessed, retrieved, modified, saved, and appended with new fields. Thus, inputting or receiving property data from a client loan portfolio may include manually inputting data by a user interface, or automatically loading property data using software capable of accessing records in the portfolio.

In step 104, the property data input or received from step 102 may be standardized. Standardizing the property data may involve converting property data input from the client loan portfolio, as necessary, into a form acceptable for querying a lien detection database. In one example, the standardization step may convert property data representing a street address into a form recognizable as a street address by the lien detection database. In another example, the standardization step may convert property data representing a mortgagor identity into a form recognizable as a borrower name by the lien detection database. Converting property data to a form of data recognizable by a lien detection database may require reading the property data and reproducing the property data in a modified form. For example, the property data may be converted by rearranging the property data to a recognizable form, or by adding additional operators (e.g., ASCII characters) to the property data in a predetermined format. In another example, the property data may be converted by appending it as an argument within a predefined function. In another example, when property data has been previously matched to a record stored in a lien detection database, converting the property data may include assigning a unique identifier to the property data to designate that it relates to a certain record stored in the lien detection database.

Method 100 may then proceed to step 106. In step 106, one or more lien detection databases may be monitored for liens related or relatable to customized property data derived from a client loan portfolio. In one embodiment, step 106 monitors the lien detection databases for any records containing the identity of the borrowers and/or the address of the subject property to discover whether any secondary liens listed therein match with the borrower identity or the address of the subject property. A lien detection database being monitored may include tax assessments or tax roll information including the name of the owner, the address of the property, a legal description of the parcel, the most recent assessed value of the property, the taxes due on the property, dimensions of the lot, and other characteristics about the property. Note that a borrower identity may be synonymous with an owner identity, and may include a name, an alias, a social security number, a government identification number, or other personal indicia. In one embodiment, step 106 may search the lien detection databases for any negative credit reporting events, bankruptcy declarations, delinquent payments, defaults, or foreclosures associated with the property address or borrower identity. In other embodiments, step 106 may be performed using standardized data from step 104 to monitor for secondary liens continuously, periodically (e.g., weekly or monthly), or according to a schedule determined by a client.

Next, step 108 may decide on appropriate action depending on whether a secondary lien is detected while monitoring the lien detection databases. If no secondary lien is detected, the method may progress to step 110, during which a match code may be set to a negative status indicating that no match has been found between a search criteria and a record maintained in any database searched. If a match is found, i.e., if a secondary lien is detected, the method may proceed to step 118. In step 118, the match code may be set to a positive status indicating that a match has been detected. In one embodiment, in step 118, the client may be promptly notified of the secondary lien or liens detected during step 106. In another embodiment, notification in step 118 may include transmitting an electronic message to the client to alert the client of the fact of the secondary lien. In another embodiment, step 118 may include sending to a client a periodic report of secondary liens pertaining to all customized property data derived from the client's loan portfolio.

The method may monitor available databases to determine whether any secondary liens are outstanding on a property, and if so, provide timely notification to an interested party. For example, the method 100 may monitor a public record database on a weekly or monthly basis for newly filed secondary liens. It may not be practical for the portfolio owner to monitor secondary loan activity with respect to every primary loan it services. The present invention addresses this problem by automating the monitoring and reporting process on behalf of a lender or prospective buyer. Once a client receives notification of a secondary lien, the client so informed may be better able to determine a more accurate CLTV ratio, to update a loan portfolio, or to request additional information about the property or its owner. The following embodiments describe additional methods for practicing the present invention to provide such additional information.

Figure 2:
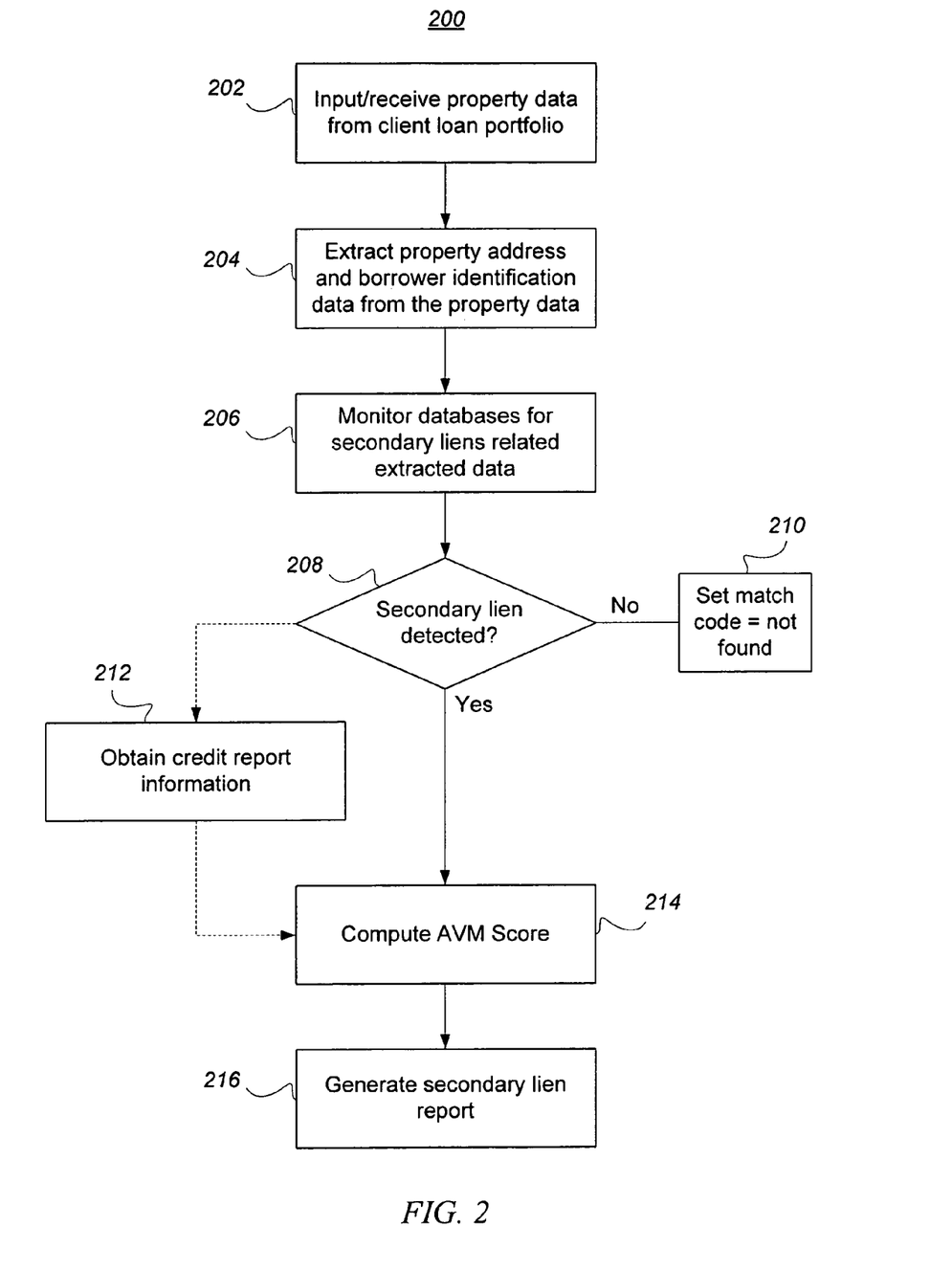
FIG. 2 is a method for updating a loan portfolio by reporting secondary liens and an AVM score according to an embodiment of the present invention.

FIG. 2 is a flow chart depicting a method 200 for monitoring a loan portfolio for information related to secondary liens. All or a portion of method 200 may be performed automatically as a service to a client, e.g., a lender, a financial institution, or a prospective buyer who may have a transactional interest in a loan or loan portfolio, and who may be in need of an automated service for monitoring properties within the portfolio for discovery of secondary liens.

Step 202 may involve inputting or receiving property data from a client loan portfolio or a client loan database in a manner similar to that executed in step 102. In step 204, the property address and the identity or identities of the owners of the subject property may be extracted from the property data input in step 202. The extracting step 204 may also involve a data conversion to convert the property address and owner identity into a form recognizable as a property address and owner identity, respectively, by a lien detection database. Alternatively, the extracting step 204 may involve copying that portion of the property address or owner identity needed to formulate an appropriate query to a lien detection database. For example, step 202 may involve inputting or receiving property data from a client loan portfolio into an electronic database having a format compatible with software executed in step 204. In this example, in step 204, only the property address and owner identity data may be extracted from the electronic database in step 204, while any extraneous information contained in the electronic database (e.g., information related to the database structure) may not be extracted.

The method may proceed to step 206, in which one or more lien detection databases may be monitored for secondary liens related or relatable to the subject property. The monitoring step 206 may occur upon client request, or periodically according to a specified period. During this monitoring step 206, property address and property owner identity data extracted in step 204 may be used to formulate appropriate search criteria for detecting a secondary lien. In the decision block of step 208, if a secondary lien is not detected, the method may progress to step 210, during which a match code may be set to a negative status indicating that no match has been found between a search criteria and a record maintained in any database searched. If a match is found, the method may proceed to step 212 or to step 214. In one embodiment, in an additional step (not shown), if a match is found, the match code may be set to a positive status indicating that a match has been detected.

Step 212 may be an optional step, to be executed to obtain credit report information in the event that a secondary lien is detected. This step may be specified by a client or subscriber, and the credit report information may be obtained on behalf of the client or subscriber according to terms of a service agreement. Credit report information may include a portion of data available from a commercial credit reporting service, or it may include an entire credit report. Credit report information may be obtained, for example, using owner identity data extracted in step 204 as search criteria for a credit report database.

Step 214 may be performed after step 208 if a secondary lien is detected. In step 214, an AVM score may be prepared to assess the value of a property having a secondary lien. An AVM score may be calculated by any type of automated process, such as a computer program, that uses data on properties comparable to the property being valuated to compute an estimate of that property's value. Input data to the AVM model may include the size of a house on the property, the number of rooms and bedrooms, the age of the house, the size of the lot, the address of the house, an inclusion radius for selecting comparable homes in same vicinity, recent appraisals and/or sales on comparable properties, and other features or upgrades present in the house or associated with its location. This input data may be entered in a previous step of method 200, such as in step 202.

Step 216 may be used to generate a secondary lien report. In one embodiment, the secondary lien report may be maintained in an electronic memory. In another embodiment, the secondary lien report may be maintained in an electronic memory and updated with additional information as that information becomes available in the course of continued monitoring of lien detection databases. In another embodiment, step 216 may include printing a hard copy of the secondary lien report.

In another embodiment, following step 216, the secondary lien report may be delivered to a client upon receiving a client request. By withholding the secondary lien report until receiving a client request, the secondary lien report may be updated over a selected time period, and may be updated with information pertaining to many properties extracted from a client loan portfolio. The secondary lien report in the form of a hard copy may be delivered to a client by mailing, or the secondary lien report may be delivered to a client electronically by any number of methods known in the art. Alternatively, the secondary lien report may be automatically and electronically delivered to a client immediately after a secondary lien has been detected. The occurrence of the secondary lien may trigger the system to automatically send the secondary lien report to the client.

A secondary lien report may include data reporting the fact of a secondary lien, as well as the property address and the identity or identities of the property owners. A secondary lien report may also include additional data pertaining to the subject property. For example, a secondary lien report may include any notices of foreclosure, foreclosure rescissions, final judgments, transactions involving the property, lien amounts, and contact information for other lenders. Tax delinquency data may also be sent along with a secondary lien report. Tax delinquency may affect the total value of the property attainable, and thus also affect the LTV or CLTV. A secondary lien report automatically generated using a method of the present invention may advantageously lessen the time required to research one or more properties and liens associated with those properties, and thereby assist a client in assessing property values, calculating LTV or CLTV ratios, or enable updating of property data within a loan portfolio.

In another embodiment, the secondary lien report and related data may not be sent to the client directly, but are made available to a client by allowing the client to download the report from a server accessible over a network. In this case, a notification of a secondary lien may be sent directly to a client. The notification may be sent concurrently with detection of the secondary lien distress, concurrently with generation of the secondary lien report, or after the secondary lien report is available. In one embodiment, the secondary lien report and related data may be made accessible to the client using a File Transfer Protocol (FTP). In another embodiment, secondary lien reports may be generated periodically and uploaded to an FTP server. Alternative time-frames may be used in different embodiments of the present invention. The client may then access uploaded reports using standard FTP client software and a login. In another embodiment, secure encryption may be used during a login and file-transfer process.

Figure 3:
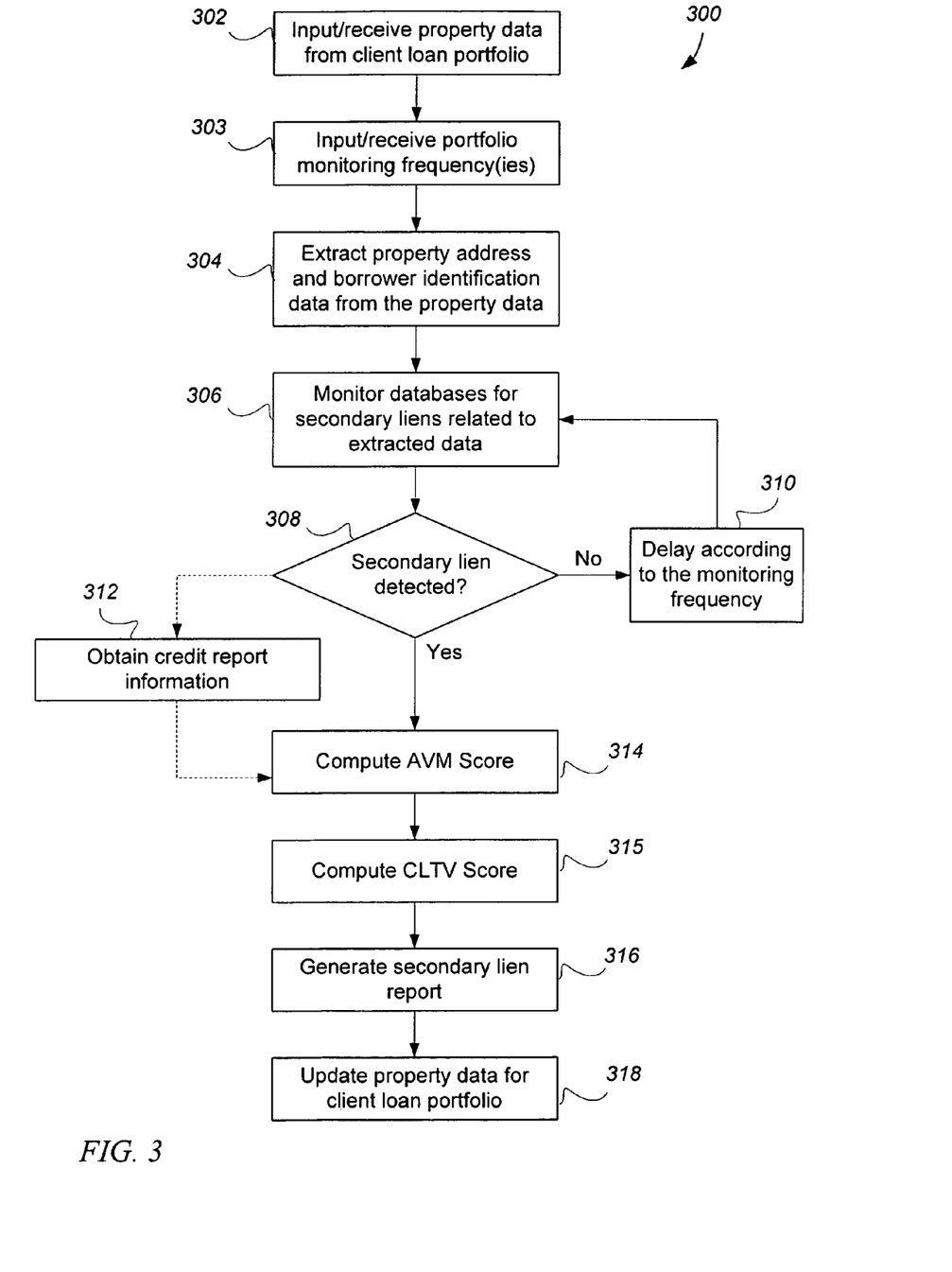
FIG. 3 is a method for updating a loan portfolio by reporting secondary liens, an AVM, and a CLTV score according to an embodiment of the present invention.

FIG. 3 is a flow chart depicting a method 300 for monitoring a loan portfolio for information related to secondary liens. In this embodiment, a method 300 may allow a client to specify a frequency or frequencies for automatic monitoring of secondary liens, and may allow automatic updating of a loan portfolio when any secondary liens are detected.

Method 300 may begin with step 302. In this step, property data may be received, e.g., by client input, from a loan portfolio for one or more properties that the client wishes to monitor for secondary liens. Next, in step 303, a client may specify one or more monitoring frequencies for loans within the loan portfolio entered in step 302. Any periodic or non-periodic monitoring frequency may be specified. For example, a simple periodic monitoring frequency such as weekly or monthly may be specified. Or, a client may specify a high monitoring frequency for properties owned by mortgagors more likely to cause secondary liens, and a low monitoring frequency for properties owned by mortgagors less likely to cause secondary liens. In determining whether a property is more or less likely to incur a secondary lien, a client may classify properties according to property owner characteristics. For example, a mortgagor who is a first-time home buyer may be more likely to incur a secondary lien in order to make home improvements. Or, a mortgagor heavily encumbered with credit card debt may be more likely to incur a secondary lien in order to pay off debts at a lower interest rate. Or, a mortgagor may have a history of encumbering properties with secondary liens. In these cases, a client may wish to specify a higher monitoring frequency.

Figure 4:
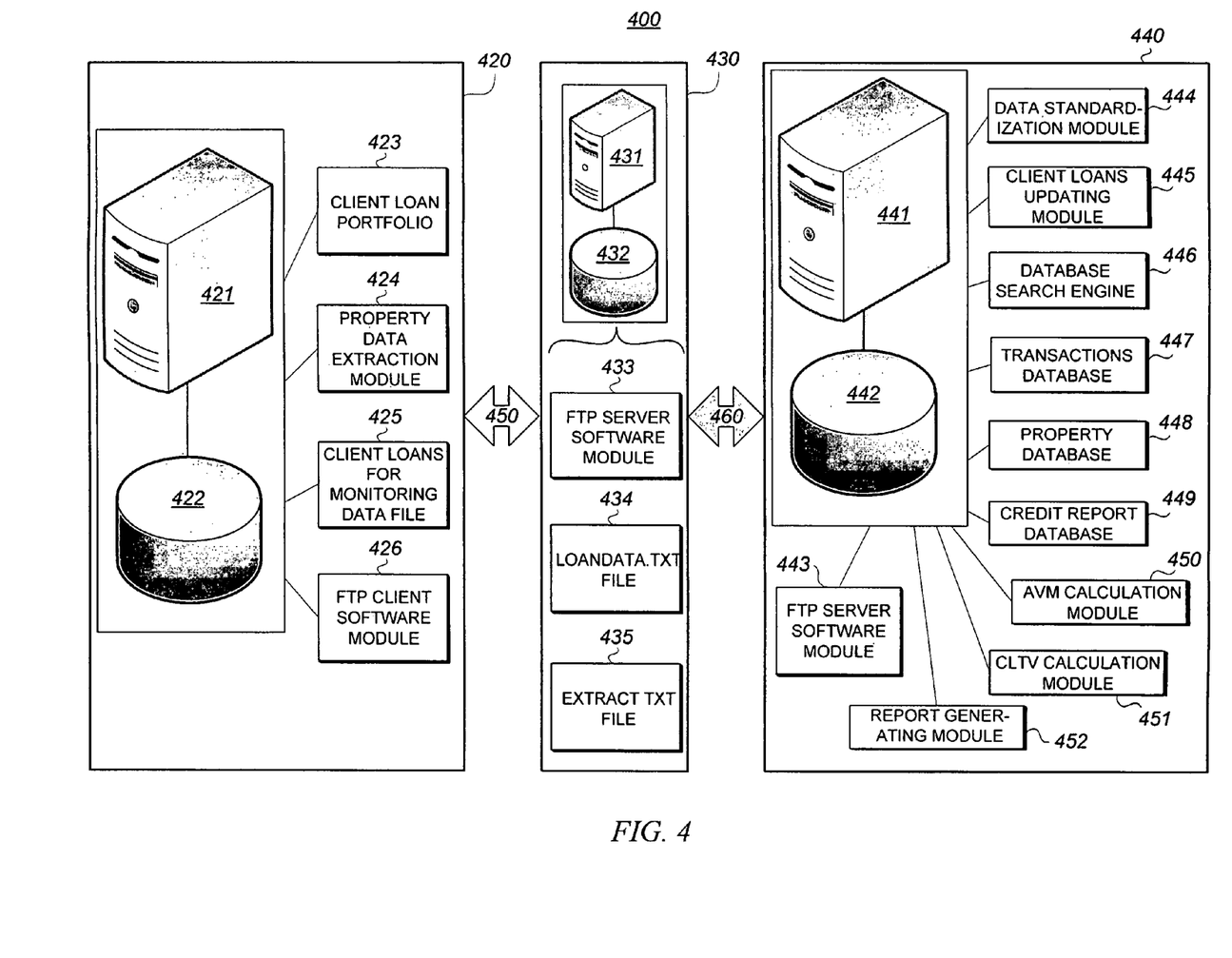
FIG. 4 is a system for updating a loan portfolio with information on secondary liens according to an embodiment of the present invention.

On the other hand, in step 303, the client may wish to specify a lower monitoring frequency for properties owned by mortgagors in a more stable financial condition and less likely to take out a secondary loan. In addition, a client may wish to vary a monitoring frequency according to changing conditions, such as a prime interest rate or the LIBOR reference rate. As interest rates fall, mortgagors may be more likely to encumber a property with a secondary lien, and vice versa. A client may also wish to vary a monitoring frequency according to a mortgagor's change in status, such as years residing in the home, income level, credit score, etc. A client may specify in step 303 that if a threshold is reached, or if a specified event should occur, the monitoring frequency may change to a higher or lower monitoring frequency. These status, thresholds, credit scores, interest rates, and other conditions or characteristics may be obtained from databases monitored in step 306, or described in the embodiment of system 400. Still other such conditions, data, or predictors of mortgagor behavior may be related to lien distress events and the detection thereof, as described more fully in related U.S. patent application Ser. No. 11/499,401, entitled METHOD AND SYSTEM FOR MONITORING FOR AND REPORTING OF LIEN DISTRESS EVENTS, filed concurrently herewith.

Once the monitoring frequency is input or received, the method may proceed to step 304. In step 304, property address data and borrower identification data may be extracted from the property data that was input or received in step 302. Note that step 304 may be unnecessary if property data received in step 302 is received in proper format, in which case the method may proceed directly from step 303 to step 306.

In step 306, one or more lien detection databases may be monitored for secondary liens related to property data received in step 302 and/or extracted in step 304. The lien detection databases may include databases that contain tax assessor records, public property records, title transfer records, and other sources that may contain evidence of primary or secondary liens. The method may then flow to decision step 308.

In step 308, if a secondary lien is not detected during the monitoring step, the method may execute process step 310. In step 310, a delay in further processing may occur, according to a monitoring frequency selected in step 303. In another embodiment, a delay may occur in step 310 according to a default monitoring frequency. Once the delay duration has been satisfied, the method may return to step 306 for additional monitoring.

In step 308, if a secondary lien is detected, the method may proceed to step 314, or the method may execute optional step 312. In optional step 312, credit report information may be obtained, for example, from a credit reporting database returning data in response to a query containing the borrower identification data. The information may be an entire credit report, or some portion thereof, on one or more borrowers associated with the detected secondary lien. If step 312 is performed, the method may proceed to step 314. Step 314 may be a computational step, which may compute an AVM score for the subject property. In one embodiment, information used in computing the AVM may be obtained during the database monitoring step 306. Another computation may be performed in step 315. Step 315 may compute a CLTV ratio. The CLTV ratio may be computed based on primary and secondary lien information, outstanding tax liability, and the AVM score computed in step 314. Data used in step 315 to arrive at a CLTV ratio may be received in step 302, may be obtained in step 306 or step 312, or may be computed in step 314.

In the next step 316, a secondary lien report may be generated as in step 216 of method 200. In addition, the secondary lien report generated in step 316 may include the credit report information, the AVM score, or the CLTV score obtained or computed in steps 312, 314, and 315, respectively. A final step in method 300 may be an updating step 318, in which property data obtained or computed during the process steps may be provided to the client for updating property data within the client loan portfolio. In one embodiment, step 318 may include updating a client loan portfolio with information related to any secondary liens detected in step 306, such as the lender name associated with the secondary lien and the value of the secondary lien. In another embodiment, in step 318 an updated electronic file representing the client loan portfolio may be provided automatically to the client. In another embodiment, the updated electronic file may be provided in step 318 to the client upon request by the client. In another embodiment, the updated electronic file may be provided in step 318 to the client periodically, according to a period specified by the client or according to a default period, or non-periodically according to the detection of a previously unknown secondary lien.

FIG. 4 is a system 400 for updating a loan portfolio with information on secondary liens according to an embodiment of the present invention. Any of the foregoing methods of the invention may be executed as a series of process steps using hardware and/or software modules shown in FIG. 4.

FIG. 4 may include three subsystems. The first subsystem may include one or more client stations 420. For simplicity, only one such client station is depicted in the figure, although other embodiments are possible which include any number of client stations. The second subsystem may include a file transfer protocol (FTP) server 430. The third subsystem may include a mainframe server 440. In one embodiment, mainframe server 440 may include a mainframe computer that also may include, or has access to, one or more secondary lien databases. Client station 420 may communicate with FTP server 430 via a network link 450. FTP server 430 may communicate with mainframe server 440 via a network link 460. Network links 450 and 460 may be separate local area network links or wide area network links, and may connect a plurality of client computers, FTP servers, and mainframe servers in any conventional configuration such as bus, star, or ring. In another embodiment, network links 450 and 460 may represent the same network, such as a local or wide area network or the Internet.

A client station 420 may include a computer 421 linked to a memory 422. In one embodiment, computer 421 may operate on a conventional platform designed for personal computers such as Windows, LINUX or Macintosh. Memory 422 may be any computer readable memory such as a hard disc, floppy disc, RAM, ROM, EEPROM, CD-ROM, flash memory, or other internal or external optical, magnetic, or solid-state device, or any combination of the foregoing. In one embodiment, memory 422 may include a client loan portfolio 423, a property data extraction module 424, a client loans for monitoring database 425, and an FTP client software module 426. In another embodiment, each of the client loan portfolio 423, the property data extraction module 424, the client loans for monitoring database 425, and the FTP client software module 426 may be accessed or executed by computer 421

Client loan portfolio 423 may be a database or other archival storage medium or software module for inputting, updating, and saving electronic data. In one embodiment, a client may be a lender, a lien holder, or an investor, and client loan portfolio 423 may contain data associated with a plurality of the client's loans or prospective loans. Data stored on client loan portfolio 423 may include records associated with each loan in the portfolio. Each record may contain information for each loan such as a property address and borrower identification, and may include a variety of additional information associated with the loan or the property such as seller identity, property descriptions, appraisal information, selling price, loan amount, loan number, contractual terms, effective dates, insurance information, property tax information, closing statements, etc.

Property data extraction module 424 may be an application that allows a client to identify which records, i.e., which loans, from its client loan portfolio the client wishes to select for secondary lien monitoring. Property data extraction module 424 may allow the client to extract key information from selected loans, and write the key information to client loans for monitoring data file 425, which may be a database, a spreadsheet, a text file, or another type of data file. Key information written to client loans for monitoring data file may be a minimum amount of information needed to perform secondary lien monitoring for one or more loans from client loan portfolio 423. One example of key information is property address data for each selected loan. Another example of key information is borrower identification data for each selected loan. Another example may be any combination of data extractable from client loan portfolio associated with a single loan. In one embodiment, key information extracted to client loans for monitoring data file 425 may be written to a text file using specified numbers of characters for each property and for other property data associated with each property.

Once the client loan for monitoring data file 425 is created, it may be uploaded to FTP server 430 using FTP client software module 426. FTP client software module 426 may be any appropriate FTP client software for initiating communication with an FTP server 430 for the purpose of exchanging or transmitting electronic files via network link 450. FTP client software module 426 may enable computer 421 to perform file manipulation operations such as uploading files, downloading files, and reading from or writing to files on a server or another computer connected to network link 450. In one embodiment, FTP client software module communicates using a TCP/IP protocol.

FTP server 430 may upload client loans for monitoring data file 425 via network link 450 and store it locally. In one embodiment, FTP server 430 may include a computer 431 coupled to a memory 432. Computer 431 and memory 432 may be similar to computer 421 and memory 422 of client station 420. In one embodiment, computer 431 may function as an application server dedicated to providing secondary lien monitoring and reporting services to one or more client stations 420. In another embodiment, computer 431 and memory 432 may form an enterprise server such as a Sun Microsystems computer running a UNIX-based Solaris or Linux operating system, or a Hewlett-Packard (HP) computer running a Microsoft Windows operating system, or an IBM computer running an iSeries operating system, or equivalent.

FTP server 430 may store a local file version of client loans for monitoring data file 425 in the same or similar format used on client station 420. Alternatively, it may store the information contained in client loans for monitoring data file 425 in a different format. One example format for this information stored in memory 432 is a text file, labeled in the figure as Loandata.txt file 434. In one embodiment, the information from client loans for monitoring data file 425 may be written as Loandata.txt file 434 to FTP server 430 using a Secure Socket Layer (SSL) encryption. In another embodiment, the loan data is written as a text file and encrypted with 1024-bit PGP encryption and then transferred to FTP server. 430. This file may list properties in a character delimited, space delimited, or fixed format file. In alternative embodiments, other types of encryption security may be used, although no encryption may be in some embodiments. An FTP server software module 433 enables uploading and downloading of files to and from FTP server 430 via network links 450 and 460.

Any of the methods according to the present invention may be implemented through interaction between FTP server 430 and mainframe server 440. Mainframe server 440 may be any computer or computer system capable of serving a plurality of users simultaneously and performing bulk data processing requests for public records and/or consumer statistics and information. The hardware of mainframe server 440 is represented in the figure as computer 441. Computer 441 is coupled to a memory 442, which may be any type of memory or combination of memory devices known in the art. Memory 442 may contain operating system software, software modules, applications, and data executable and/or accessible by computer 441. FTP server software module 443 accessible by computer 441 enables uploading and downloading of files to and from mainframe server 440 via network link 460.

Client loan information to be monitored for secondary liens contained on FTP server 430 in a file such as Loandata.txt file 434 may be downloaded to mainframe server 440 via network link 460. In an embodiment using SSL, Loandata.txt file 434 may be encrypted by FTP server 430 prior to transmission, and decrypted by mainframe server 440 after receipt. Once downloaded, and (if necessary) decrypted, computer 441 may execute data standardization module 444 to re-form key information associated with the client loans into a standardized format that is readable by a database search engine 446. The key information, now in standardized format, may be stored in a client loans updating module 445.

Client loans updating module 445 may be created upon an initial downloading (or receipt) of client loan information from a particular client. There may be one client loans updating module 445 for each client using mainframe server 440 for secondary lien monitoring. If a client loans updating module 445 has been previously established for a client when a subsequent downloading of client loan information for the same client is standardized by data standardization module 444, the client loans updating module 445 may be updated with the new information. In this way, a mainframe server 440 can maintain up-to-date representation of a loan portfolio for each client that it serves.

Database search engine 446 may monitor for secondary liens associated with a client loan portfolio by querying one or more databases. Querying may occur according to a default or pre-selected frequency. In one embodiment, database search engine 446 may monitor the databases for any liens recorded subsequent to the most recent search. Examples of these databases are a transactions database 447, which may store information related to real estate sales or title transfer transactions; a property database 448, which may store information about real property such as liens and/or tax liability; and a credit report database 449, which may store credit related data for consumers (e.g., Equifax, Experian, TRW). The contents of a query to one of these databases may use key information retrievable from client loans updating module 445. A query may be presented to a records database 447, 448, 449 in such a way that the records database may return a secondary lien when key information (e.g., property address or borrower identification) or other standardized client loan information matches information associated with the secondary lien recorded in records database 447, 448, and 449. A records database may be queried in this manner according to a predetermined frequency, or periodically as specified by a client.

While monitoring for secondary liens, whenever a secondary lien is detected that relates to a loan in a client loan portfolio, computer 441 may initiate notification of the secondary lien in the form of an electronic communication transmitted to the client over network link 460. FTP server software module 443 may be used to effect this communication. In addition, computer 441 may execute report generating module 452, which creates a secondary lien report listing the secondary liens detected in one or more records databases 447, 448, and 449. The secondary lien report may include information describing one or more secondary liens, the property or properties associated with the secondary liens, borrower identification, and other information associated with the property or borrowers. For example, an AVM may be computed using an AVM calculation module 450, and the AVM score may be included in the secondary lien report. Data used to compute the AVM may be obtained from one or more records databases 447, 448, and 449.

In another example, a CLTV ratio may be computed using a CLTV calculation module 451. The CLTV ratio may also be included in the secondary lien report. Data used to compute the CLTV ratio may also be obtained from one or more of records databases 447, 448, and 449.

In one embodiment, the secondary lien report may be saved as a text file, and the text file may be character delimited, space delimited or in a fixed format. The report may be stored in memory 442, encrypted, and/or transmitted using SSL (if necessary) as a form of notification to a client via network link 460 by computer 441 using FTP server software module 443. When uploaded to FTP server 430, the report may be saved in memory 432. In one embodiment, the report may be saved in memory 432 on FTP server 430 as Extract.txt file 435. In another embodiment, Extract.txt file may be an updated version of Loandata.txt, appended with newly discovered secondary lien information. In another embodiment, a notification of the availability of Extract.txt file for downloading may be transmitted to a client electronically via fax or e-mail, or the Extract.txt file itself may be transmitted to the client electronically.

A client may retrieve a secondary lien report by downloading Extract.txt file 435 from FTP server 430 using SSL or other encryption (if necessary), and the appropriate FTP client and server software modules. Using appropriate software, computer 421 may convert Extract.txt file 435 into a form readable by a client, for example, by displaying the text or printing a hard copy. Extract.txt file 435 may be saved in memory 426 for later review. The client may thus be apprised of any secondary liens affecting property associated with loans in the client loan portfolio 423. In another embodiment, client station 420 may also update loan records in client loan portfolio 423 with secondary lien information received in Extract.txt file 435.

The invention has been disclosed in an illustrative manner. Accordingly, the terminology employed throughout should be read in an exemplary rather than a limiting manner. Although minor modifications of the present invention will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A computer-based method of updating a loan portfolio with information on secondary liens, comprising:
   inputting, using a computer, property data from a client loan portfolio for client loans to be monitored;
   iteratively monitoring, using the computer, one or more databases for secondary liens relatable to the client loans to be monitored; and if a previously undetected secondary lien relatable to the client loans to be monitored is detected,
   computing an automated valuation model (AVM) score,
   computing a combined loan-to-value (CLTV) score based on the previously undetected secondary lien and the AVM score, and
   generating a secondary lien report including the CLTV score.

2. The method of claim 1 further comprising updating the input property data from the client loan portfolio according to information contained in the secondary lien report.

3. The method of claim 2 wherein the updating step further comprises sending the secondary lien report to a client upon client demand.

4. The method of claim 3 further comprising if a secondary lien relatable to the client loans to be monitored is detected, obtaining credit report information based on the borrower identification data.

5. The method of claim 3 further comprising:
   detecting tax delinquency data from the one or more databases; and
   sending the tax delinquency data to the client with the secondary lien report.

6. The method of claim 2 wherein the input property data is received as an electronic file, and wherein the updating step further comprises generating a new version of the electronic file to include secondary liens detected during the monitoring step.

7. The method of claim 1 further comprising, prior to the monitoring step, extracting borrower identification data from the input property data.

8. The method of claim 1 wherein one of the one or more monitoring frequencies is based on a reference interest rate.

9. The method of claim 1 wherein one of the one or more monitoring frequencies is based on an amount of credit card debt of a property owner in the property data.

10. The method of claim 1 wherein the secondary lien report includes at least one of notice of foreclosure, foreclosure rescission or final judgment.

11. The method of claim 1 further comprising the step of detecting tax delinquency data from the one or more databases.

12. The method of claim 1 wherein the step of computing the CLTV score includes computing the CLTV score based on the detected tax delinquency data, the AVM, and the previously undetected secondary lien.

13. A computer-based method of updating a loan portfolio with information on secondary liens, comprising:
   receiving property data from a client loan portfolio;
   iteratively monitoring for secondary liens relatable to the property data;
   detecting previously undetected secondary liens; and
   computing a combined loan-to-value (CLTV) score which includes the total loan amount based on the original loan and any previously undetected secondary liens divided by a valuation provided by an automated valuation model (AVM) using the computer; and
   creating a report including the CLTV score when a previously undetected secondary lien is detected.

14. The method of claim 13 wherein the property data comprises an address of a property.

15. A tangible, computer readable medium comprising program instructions, wherein the program instructions cause a computer to:
   receive property data from a client loan portfolio;
   iteratively monitor for secondary liens relatable to the property data;
   detect previously undetected secondary liens;
   compute a combined loan-to-value (CLTV) score which includes the total loan amount based on the original loan and any previously undetected secondary liens divided by a valuation provided by an automated valuation model (AVM); and
   create a report including the CLTV score when a previously undetected secondary lien is detected.

* * * * *